Jan. 14, 1936.                J. A. WIDMER                2,027,945
                            RECORDING DEVICE
                        Filed Oct. 27, 1931            3 Sheets-Sheet 1
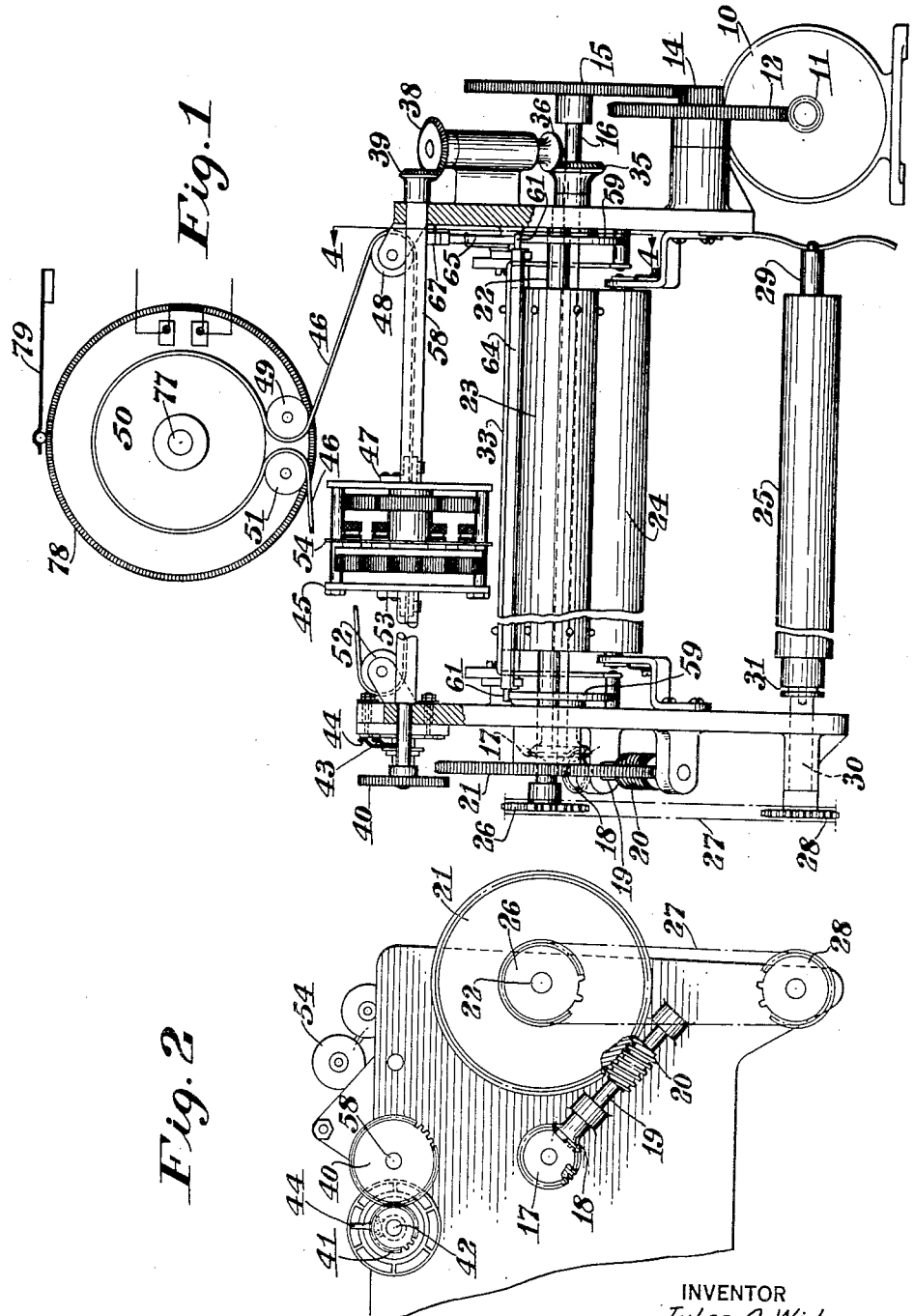
INVENTOR
Jules A. Widmer
BY D. Clyde Jones
ATTORNEY Jan. 14, 1936.                    J. A. WIDMER                    2,027,945
                                RECORDING DEVICE
                              Filed Oct. 27, 1931                3 Sheets-Sheet 2
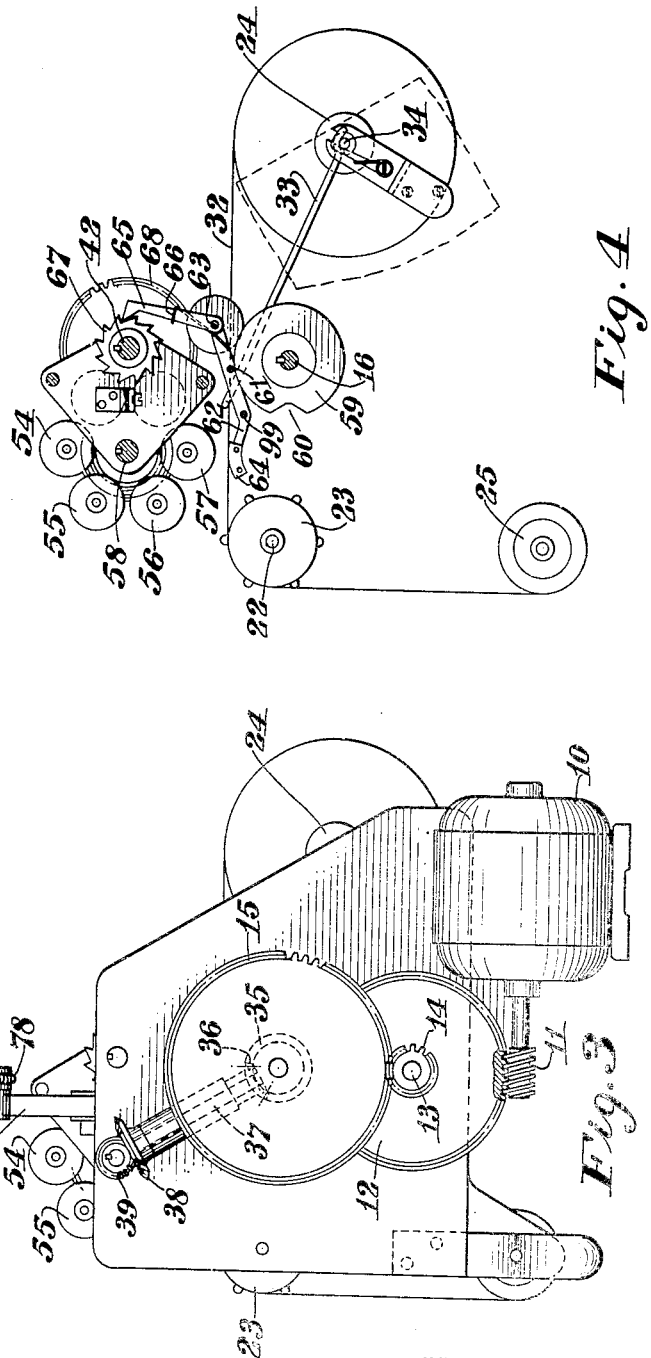
INVENTOR
Jules A. Widmer
BY D. Clyde Jones
ATTORNEY Jan. 14, 1936. J. A. WIDMER 2,027,945
RECORDING DEVICE
Filed Oct. 27, 1931 3 Sheets-Sheet 3
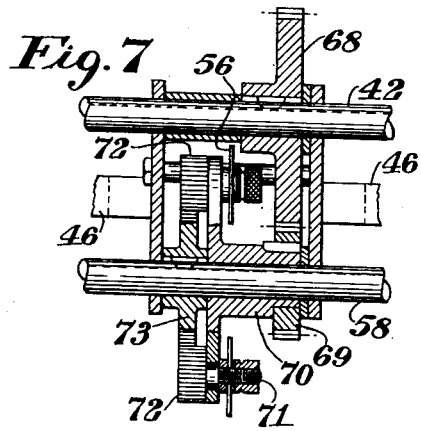
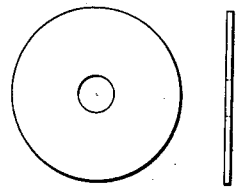
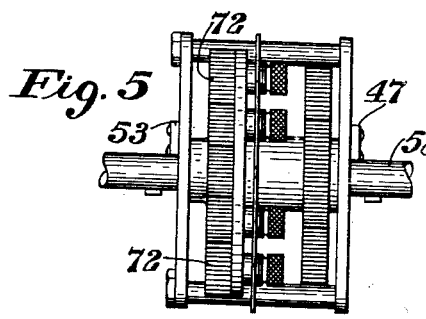
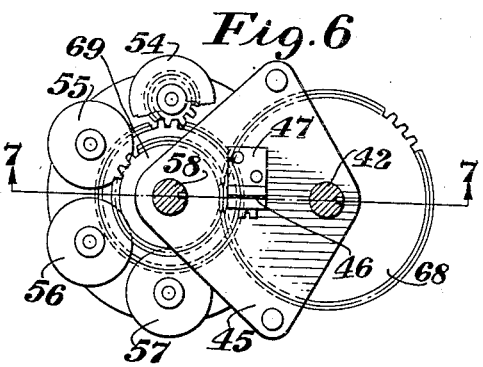
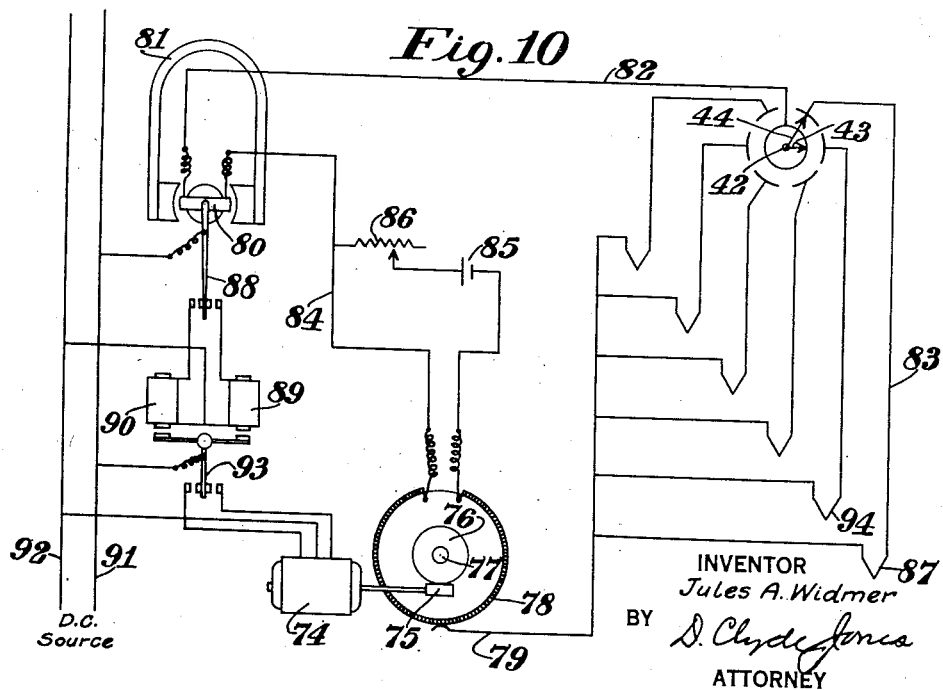
INVENTOR
Jules A. Widmer
BY D. Clyde Jones
ATTORNEY Patented Jan. 14, 1936

2,027,945

UNITED STATES PATENT OFFICE 2,027,945

RECORDING DEVICE

Jules A. Widmer, Rochester, N. Y., assignor to Taylor Instrument Companies, Rochester, N. Y., a corporation of New York Application October 27, 1931, Serial No. 571,376

6 Claims. (Cl. 234—1)

This invention relates to recording devices and more particularly to recording instruments of the type which measure a plurality of conditions and mark a plurality of graphs corresponding thereto on a chart.

In the past, when it was desired to make a plurality of simultaneous records on a chart several expedients were resorted to. One of these utilized several pens or styluses each provided with a different colored ink, but this arrangement had the disadvantage that it was necessary frequently to supply ink to the several pens or styluses, and if for any reason the chart remained stationary large blots were formed thereon by the pens or the pens dried up and had to be cleaned out again.

Another plan that has been followed was the use of a multi-colored typewriter ribbon, arranged to be moved with respect to the chart, in order to bring a proper color strip into the desired indicating position on the chart, after which a marking element such as the indicating needle of a galvanometer, served to impress the positioned color strip of the ribbon on the chart. This arrangement possessed the disadvantage that typewriter ribbons are relatively expensive and dry out even when they are not in use and, in addition, are not easily replaced in the recording instrument.

A different arrangement that has been followed where not more than two indicating graphs were desired, was the use of dots for one indication and dashes for a second indication on the chart. Aside from the fact that the dot and dash graphs are not as distinctive as when made in color, such an arrangement fails to satisfy conditions where more than two simultaneous records are to be made.

It has also been proposed in the drawing of a plurality of indicating graphs to employ dots all of the same color and with the dots of each series a repetition of a number distinctive to each graph, is associated. Such a chart, however, is difficult to follow and if several graphs crossed each other, as frequently occurs, the resulting record became especially confusing.

In order to overcome the disadvantages and difficulties encountered in the former arrangements, it is proposed in accordance with the present invention, to provide a plurality of dry-colored marking elements similar in composition to that used in colored pencils, and to mount these elements so that they may be brought into marking relation with a chart to form a plurality of differently colored graphs corresponding to the several conditions to be measured and recorded.

A further feature of the invention relates to a marking element in the form of a disc of such thickness as to make a fine line when its edge is drawn across a chart and yet has sufficient strength not to be crushed when a mark is made.

A further feature of the invention relates to means for moving a plurality of such colored marking elements in an orbit to bring a certain marking element into effective relation to a chart, to move the elements transversely of the orbit in accordance with the indication on a measuring device individual to said effective marking element and to rotate said elements, including the effective marking element, to make a mark on the chart.

For a clearer understanding of the invention, reference is made to the drawings in which Fig. 1 is a front elevation (partially broken away) of the recording instrument of the present invention; Fig. 2 is an elevational view of a portion of the left end of the instrument as shown in Fig. 1; Fig. 3 is an elevational view of the right end of a recording instrument as shown in Fig. 1; Fig. 4 is a sectional view taken on line 4—4 of Fig. 1 looking in the direction of the arrows; Fig. 5 is a detail view of the carriage for operating the several marking elements; Fig. 6 is an end view of this carriage showing means for revolving the turret and means for rotating the individual marking elements; Fig. 7 is a sectional view taken on line 7—7 of Fig. 6; Figs. 8 and 9, respectively, show a plan view and an elevational view of an annular marking element or marking disc; and Fig. 10 is a diagrammatic showing of the electrical circuits of a pyrometric system of which the mechanical device of the foregoing figures forms a part.

By way of disclosing one of many possible applications of the invention, it has been shown incorporated in a recorder to be utilized in a system for recording the readings of a plurality of pyrometers. In the structure of the present disclosure, a chart is progressively advanced according to any desired schedule and the separate readings of the individual pyrometers are translated into a plurality of graphs of different colors, one color being distinctive to each pyrometric reading. The structural details of the present recorder is generally shown in Fig. 1, where 10 designates a motor of any well-known construction, on the shaft of which there is provided a worm 11 meshing with a worm gear 12 secured on a stub shaft, mounted in frame of the instrument. On this stub shaft there is also secured a pinion 14 which meshes with a gear 15 mounted on the shaft 16, in turn supported in bearings to extend across the recorder. The free end of this shaft has attached thereto, a bevel gear 17 meshing with a second bevel gear 18 mounted on the end of the shaft 19, which shaft is provided with a worm 20. This worm engages a worm gear 21 to drive the shaft 22 on which there is mounted the sprocket roll 23 by which the paper chart (shown in Fig. 4) may be advanced between the chart supply roll 24 to the take up roll 25. The left end of the shaft 22 has mounted thereon a sprocket wheel 26 by means of which chain 27 drives a similar sprocket wheel 28 on the end of the stub shaft 30. This stub shaft, in turn, actuates the shaft 29 of the take-up roll 25. It should be noted that the shaft 29 is connected to the stub shaft 30 through a well-known friction clutch 31, and thus the stub shaft 30 may be rotated faster than the shaft 22 of the sprocket roll 23, but there will be sufficient slippage in the take-up roll 25 so that the paper chart is always drawn just taut. As shown in Fig. 4, the paper chart 32 passes from the supply roll 24 over the sprocket roll 23 to the take-up roll 25. A U-shaped member or bail 33 pivoted at 34 and spring actuated in a downward direction, tends to move the chart away toward a marking plate and away from a carriage, both of which will be further described.

The shaft 16 also has secured thereto a bevel gear 35 which engages a bevel gear 36 on the shaft 37. The upper end of this shaft has fastened thereon a bevel gear 38 meshing with a second bevel gear 39 on the shaft 58 which extends across the recorder. On the opposite end of this shaft there is fixed a gear 40, meshing with pinion 41 which is mounted on the shaft 42. This shaft is provided with brushes 43 and 44 which engage conducting segments mounted on the frame of the instrument, as will be more clearly understood from the circuit diagram of Fig. 10.

A turret 70 in carriage 45 is mounted to rotate with the shaft 58 but is capable of longitudinal movement thereon with the carriage under the control of the wire ribbon 46. This ribbon is fastened at 47 to one side of the carriage and then passes about the pulley 48 and the guide roll 49, thence around the drum 50, guide roll 51, pulley 52 to the other side 53 of the carriage. As will be pointed out further in this description, the drum 50 is rotatable clockwise or counter-clockwise by a motor 74 (Fig. 10) to move the carriage 45 either to the right or to the left longitudinally of the shafts 58 and 42. The carriage is provided with a series of annular marking elements 54, 55, 56, 57, etc., each of which is made of a writing material such as crayon composition, having a distinctive color. Although such annular element may be of various thicknesses, I have found that a thickness of not greater than one thirty-second of an inch is especially satisfactory.

On the shaft 16 at each side of the instrument there is mounted a cam 59 having a cutout portion 60, the periphery of these cams being engaged by the follower pins 61 mounted on the arms 62 which are pivoted at 99 (Fig. 4). The free ends of the arms 62 carry a marking plate or shoe 64 extending beyond each side and beneath the chart so that the chart may be elevated into marking engagement with one of the marking elements such as 57. A pawl 65 pivoted at 63 is flexibly connected and actuated by the spring 66 whenever the arms 62 are moved. The pawl 65 is in driving relation with the ratchet wheel 67 which is secured to the shaft 42 (Fig. 4). As has been pointed out, the carriage 45 is movable longitudinally of the instrument on the shafts 58 and 42. In this carriage there is provided a gear 68 which is slidable longitudinally on shaft 42 but rotatable therewith, which gear drives the pinion 69 keyed on the hub of the turret 70. This turret is freely movable on shaft 58 and supports the marking elements such as 56, 57, etc., each marking element being detachably supported on a spindle 71 passing through the turret and terminating at one end in a pinion 72. Each of these pinions 72 is arranged to be rotated from a gear 73 which is slidable longitudinally on shaft 58 and is constantly rotated by this shaft.

Referring now to the circuit diagram of Fig. 10, there is indicated a reversible motor 74 on the shaft of which there is provided a worm 75 for driving a worm gear 76. This worm gear drives the shaft 77 which, in turn, drives the drum mechanism 50 shown in Figs. 1 and 3. There is also mounted on the shaft 77 a resistor element 78, which element is preferably formed in the well-known manner by winding many turns of fine resistance wire with the turns insulated from each other and wound on a rather heavy insulating core such as insulated wire. On the surface of this resistor 78, there engages a contactor 79 mounted on a suitable portion of the frame of the instrument. It will be recalled by reference to Figs. 1 and 2 that a suitable switch including the brushes 43 and 44 are driven intermittently by the shaft 42 to bring the brush 44 successively into engagement with the different conducting segments of the switch, as is more clearly indicated diagrammatically in Fig. 10. With the brush 44 in the position shown in this figure, a thermocouple or pyrometric element 87 together with a coil 80 of a galvonometer generally designated 81, are connected in a portion of a circuit network. The primary portion of this circuit network extends from one pole of the battery 85 through the resistor 78, conductor 84, rheostat 86 to the other pole of the battery. The secondary portion of this network, which is connected potentiometer fashion to the primary circuit, may be traced as extending from one terminal of the thermocouple element 87 through contactor 79, the left hand portion of resistor 78, conductor 84, the galvanometer coil 80, conductor 82, brushes 43 and 44 of the switch, conductor 83 to the other terminal of the thermocouple element. When the potentials across the left hand portion of resistor 78, due to the battery 85 and the thermocouple 87, are equal and opposed, the galvanometer shows no deflection. However, when these potentials are not equal, the galvanometer needle will be deflected either to the right or to the left and will thereby complete a circuit either through the winding of relay 89 or through the winding of the relay 90. Let it be assumed that this needle is deflected to the right, in which case a circuit is completed from one side of the D. C. source, conductor 91, galvanometer needle 88 and its right hand contact, winding of relay 89 and conductor 92 to the other side of the current source. The relay 89 thus attracts its armature to close its right hand contact, thereby closing a circuit from the D. C. source, conductor 91, armature 93 and its right hand contact, one of the windings of the motor 74, conductor 92, to the other side of the current source. This circuit operates the motor 74 which, through the worm 75 and the worm gear 76, rotates the shaft 77 and, in turn, the drum 50 together with the resistor element 78. This resistor element is adjusted until there is no deflection of the needle 88 of the galvanometer, at which time the relay 89 returns its armature to normal, thereby causing the motor 74 to cease its operation. It will be appreciated that as the drum 50 rotates, this causes the ribbon 46 to move the carriage 45 transversely of the chart 32 until one dry marking element such as 57 is properly positioned with respect to the chart to give a correct measurement of the temperature indicated by the thermocouple 87. It will be remembered that the motor 10 is continuously advancing the chart 32 and is continuously rotating the several marking elements 54, 55, etc. on their axis. The cam 59 which likewise continuously rotates with the chart under the control of motor 10, intermittently actuates the pawl 65 and ratchet 67 to revolve these dry marking elements about the shaft 58 in order to position a succeeding marking element in marking position. The pawl and ratchet mechanism at the same time, also causes the switch brush 44 to engage a succeeding switch terminal whereby the thermocouple 94 is connected into the mentioned circuit network and the thermocouple 87 is disabled. From the foregoing, it will be unstood that each of the marking elements such as 54, 55, etc. is individual to one of the series of thermocouples such as 94 and 87. In general, the operation of the system is as follows:

The temperature indicated by the thermocouple 87 sets up a difference of potential across the terminals of the common portion of the primary and secondary network, so that the galvanometer 81 is deflected, for example, to close its right-hand contact, which results in the energization of the relay 89. This relay on operating its armature 93 closes an operating circuit for the right-hand winding of the motor 74. This motor, by means of the worm 75 and gear 76, rotates the shaft 77 and therewith the resistor 78 as well as the drum 50, until there is no difference in potential across the terminals of the common portion of the primary and secondary network. At this time the galvanometer needle 88 returns to its normal position. As the drum 50 rotates, it moves the carriage 45 transversely of the chart, so that all of the marking elements are moved opposite the proper temperature point on the chart. Then as the motor 10 rotates the chart and the related mechanical equipment, the cam 59 is likewise rotated until the pin 61 on arm 62 drops into the cut-off portion 60 of the cam. At this time the marking plate 64 is elevated to bring the chart 32 into contact with the marking element 57 (Fig. 4) which has been positioned transversely of the chart in the manner just described. It will be recalled that all of the marking elements including element 57 are constantly rotating, so that a short mark is made on the chart 32 in accordance with the temperature just indicated. When the pin 61 rises following its drop into the cut-out portion of the cam 59, the pawl 65 by means of the ratchet 67 rotates the turret 70, thereby revolving all of the marking elements to bring a succeeding marking element such as 56 into the position previously occupied by the marking element 57. At the same time that the turret 70 is revolved, the brushes 43 and 44 are rotated one step in order to disconnect the thermocouple element 87 from the circuit network and to connect thermocouple element 94 to this network. The operations just described are repeated for each of the thermocouple elements to complete a cycle of operation and are repeated for each succeeding cycle.

While the invention has been shown in connection with one form of pyrometric device, it is not so limited but it may be employed with various types of pyrometers and may be employed for recording any other condition such as pressure, etc. While six different colors have been provided for the several readings of the six different thermocouples, it will be understood that almost any number of such marking elements may be employed, the limits on the number being the practical size and weight of the carriage 45.

I claim:

1. In combination with a chart, a plurality of indicating elements, a carriage provided with a plurality of colored marking members, each member being individual to a certain element, means for rendering said elements effective in succession, means for moving said carriage transversely of the chart in response to the indication of an associated element, means for revolving said members to position the individual member corresponding to said effective element into marking relation with respect to said chart, means for supporting a portion of said chart in engagement with said last-mentioned member, and means for actuating said last-mentioned member to make a mark on said chart.

2. In combination with a plurality of indicating elements to indicate a plurality of conditions to be recorded, a device responsive to said elements, switching means for connecting said elements in succession to said device, a chart, a carriage movable transversely of said chart under the control of said responsive device, a plurality of marking members on said carriage, each member being individual to a certain one of said elements, means for simultaneously operating said switching means for associating one of said elements with said responsive device and for bringing its corresponding marking member into operating relation with respect to said chart, means for supporting a portion of said chart in engagement with said last-mentioned member, and means for causing said last-mentioned marking member to mark on said chart in accordance with the position of said carriage.

3. In combination with a plurality of thermocouples, a galvanometer responsive to said thermocouples, switching means for connecting said thermocouples in succession to said galvanometer, a chart, a carriage movable transversely of said chart under the control of said galvanometer, a plurality of marking members on said carriage, each member being individual to one of said thermocouples, means for simultaneously operating said switching means for associating one of said thermocouples with said galvanometer and for revolving the marking member individual to said thermocouple into operating relation with respect to said chart, means for supporting a portion of said chart in engagement with said last-mentioned member, and means for causing said last-mentioned member to mark on said chart in accordance with the position of said carriage.

4. In combination with a chart, a plurality of marking discs, means for intermittently revolving said discs to position one of them opposite said chart, means for supporting a portion of said chart in contact with the disc so positioned and means for moving said last-mentioned disc to mark on said chart.

5. In combination with a plurality of temperature-responsive elements, a chart, a carriage provided with a plurality of colored marking members, each member being individual to a certain element, means for moving the carriage transversely of the chart to a position corresponding to a certain responsive element the indication of which is to be recorded, means including a portion of said carriage for revolving said marking members to bring the individual marking member corresponding to said certain element into marking relation with respect to said chart, means for supporting a portion of said chart in engagement with said last-mentioned member, and means for rotating said last-mentioned member to mark on said chart.

6. In combination, a thin dry marking element, a chart normally out of contact with said marking element, means for effecting engagement between said chart and the edge of said element, and motor means for directly rotating said element about its own axis to make a mark on said chart independently of the movement of said chart.

JULES A. WIDMER.